United States Patent Office 3,297,629
Patented Jan. 10, 1967

3,297,629
POLYVINYL CHLORIDE RESIN COMPOSITIONS HAVING INCREASED RESISTANCE TO HEAT DETERIORATION
Otto S. Kauder, Jamaica, N.Y., assignor to Argus Chemical Corporation, Brooklyn, N.Y., a corporation of New York
No Drawing. Filed Mar. 26, 1962, Ser. No. 182,634
17 Claims. (Cl. 260—45.75)

This invention relates to rigid, i.e. unplasticized, polyvinyl chloride resin compositions containing an organotin compound and an organic sulfide and having, as a result, an improved resistance to deterioration when heated at temperatures of 375° F. and higher.

Many organotin compounds are now widely recognized as the best available single-compound stabilizers for polyvinyl chloride resins. Even the best of these, however, is not always satisfactory.

Numerous types of organotin compounds have been proposed for the stabilization of polyvinyl chloride resins, among them, the alkyl tin mercaptides and alkyl tin mercaptoesters described in United States Patents Nos. 2,914,506 to Mack, 2,801,258 and 2,891,922 to Johnson, 2,726,254 and 2,870,119 to Leistner, 2,726,227 to Leistner, and 2,641,588 to Leistner, and 2,954,363 to Kuehne; the alkyl tin mercapto-acid ester compounds described in United States Patent No. 2,641,596; the alkyl tin amides of thio acids described in United States Patent No. 2,704,756 to Leistner; and the alkyl tin cyclic glycol thio acid esters described in United States Patent No. 2,752,325 to Leistner; the alkyl tin xanthates described in United States Patent No. 2,759,906 to Leistner; and the alkyl tin esters of mercapto alcohols of United States Patents Nos. 2,870,119, 2,870,182, 2,872,468 and 2,883,363 to Leistner et al.

These organotin compounds have in common a hydrocarbon group directly attached to tin through a carbon atom, and a sulfur-containing radical attached to the tin through the sulfur atom. This combination of radicals is recognized as giving optimum stabilization, from the standpoint of clarity and minimizing loss of hydrogen halide from the resin. However, sulfur-containing radicals introduce an odor problem.

Several types of organotin compounds have been suggested in which the tin is not linked to sulfur. These compounds have a hydrocarbon group directly attached to tin through a carbon atom, and an oxygen-containing group, such as an alkoxy or an ester group, attached to tin through oxygen. Typical of these compounds are those described in the U.S. Patents Nos. 2,938,013 to Mack et al. and 2,680,107 to Lesistner et al. However, the oxygen-containing radicals do not impart as good a stabilizing effect as sulfur radicals.

U.S. Patent No. 2,307,157 to Quattlebaum et al. suggests the use of sulfur-free organotin carboxylates as the sole color-stabilizing agents for vinyl chloride compositions. The results obtained through the use of these compounds alone are not as effective as the results obtained through the use of sulfur-containing compounds. Some modifications have been made in the Quattlebaum type process, such as, for example, the use of compounds such as bis-(dibutyltin monolaurate) maleate, a complex compound containing two tin atoms per molecule. Despite modifications, the sulfur-containing compounds are more effective as stabilizers.

Leistner et al. in U.S. Patent No. 2,564,646 disclose the stabilization of polyvinyl chloride resins with metal salts including certain organotin compounds. Anti-clouding agents are also added to the compounds. The preferred anti-clouding agents are said to be the organic phosphites. The patentees indicate that when less effective anti-clouding results are acceptable, other anti-clouding agents may be employed such as the hindered phenols and the organic sulfides. The polyvinyl chloride resin compositions contemplated by the Leistner et al. patent are all plasticized compositions. The working examples therein all indicate the use of appreciable amounts of plasticizer. Stabilizers which are effective for plasticized resins are not necessarily satisfactory when used in rigid polyvinyl chloride resin compositions. Rigid compositions by their nature must be processed at substantially higher temperatures than plasticized compositions. Thus, many stabilizers for plasticized resins, although affording adequate stability at lower temperatures are not satisfactory under the more severe conditions. Stabilizers for plasticized resins are conventionally tested at 350° F. whereas rigid resin stabilizers should be effective to prevent deterioration upon heating for one hour at 375° F. The particular stabilizer combinations now found to be effective under the more severe conditions required for rigid polyvinyl chloride resins are not disclosed in the Leistner et al. patent which is more concerned with the lower temperature requirements for stabilization of plasticized resins.

In accordance with the present invention, rigid polyvinyl chloride resins having improved resistance to deterioration when heated at 375° F. for up to one hour are provided comprising an organotin compound free from sulfur, but having as good a stability as polyvinyl chloride resins stabilized with an organotin sulfur-containing compound but with better color retention and less odor. This invention makes use of the beneficial and synergistic stabilizing effect upon polyvinyl chloride of organic sulfides containing the nucleus >CH—S—CH< in the molecule. Thus, the rigid polyvinyl chloride resin compositions of this invention comprise a sulfide compound of the types described and an organotin compound having organic radicals linked to tin only through carbon and oxygen, at least two organic radicals being linked through carbon and at least one organic radical being linked through oxygen to a carboxyl group of an unsaturated dicarboxylic acid in which the carboxyl group not linked to the tin atom will have been reacted to form an ester linkage with a suitable monohydric or polyhydric alcohol. The specified organic sulfide alone impart no observable stabilizing effect to unplasticized polyvinyl chloride resins and the organotin half esters are not very effective stabilizers but the two together form a stabilizing composition which is extremely effective even at 375° F. and equal in performance to the conventional sulful-containing tin compounds but without the disadvantage of extremely unpleasant odor.

The organotin compound can be either monomeric or polymeric but is preferably monomeric. The preferred organotin compounds used in the invention can be further defined by the formula:

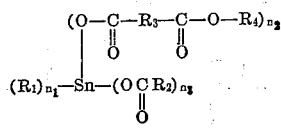

In the above formula, $R_1$ and $R_2$ are hydrocarbon radicals having from about one to about thirty carbon atoms, which can contain inert substituent groups such as halogen, ether and ester groups.

$R_1$ can, for example, be an aliphatic group such as alkyl and alkenyl, a cycloaliphatic group such as cycloalkyl and cycloalkenyl, or a heterocyclic group, other than nitrogen-containing heterocyclic groups. Exemplary are, methyl, ethyl, propyl, propenyl, isopropyl, n-butyl, butenyl, vinyl, isobutyl, tert-butyl, sec-butyl, amyl, hexyl, octyl, oleyl, 2-ethylhexyl, iso-octyl, lauryl, stearyl, behenyl, allyl, furfuryl, cyclohexyl, cyclopentyl, tetrahydropyranyl and tetrahydrofurfuryl.

The

group can be derived from an organic mono or poly carboxylic acid, saturated or unsaturated, of the formula $R_2COOH$ including aliphatic, aromatic, cycloaliphatic and heterocyclic acids, which can contain inert substituents such as halogen, hydroxyl, keto and alkoxy groups, such as, for example, acetic acid, propionic acid, oleic acid, ricinoleic acid, linoleic acid, stearic acid, butyric acid, valeric acid, chloroacetic acid, hexanoic acid, octanoic acid, lactic acid, levulinic acid, 4-methoxy butyric acid, lauric acid, behenic acid, linoleic acid, palmitic acid, benzoic acid, methylbenzoic acid, cyclohexane carboxylic acid and furoic acid.

$R_3$ is a hydrocarbon group having from about one to about thirty carbon atoms and containing an ethylenic double bond. The ethylenic double bond is located such that in an acid of the formula

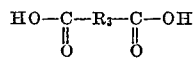

the said double bond is alpha to a carboxyl group. The $R_3$ groups are derived from alpha beta unsaturated dicarboxylic acids containing from about four to about ten carbon atoms, such as maleic acid, fumaric acid, itaconic acid, glutaconic acid, 2-hydromuconic acid, citraconic acid, 2-hexene-1,4-dicarboxylic acid, 2-octene-1,8-dioic acid, cyclohexene-1,2-dicarboxylic acid and 2,5-heptadienedioic acid.

$R_4$ is an organic group derived from a monohydric or polyhydric alcohol of the formula $R_4$—$(OH)_{n_4}$ where $n_4$ is an integer from one to about four but is preferably one or two. Thus, $R_4$ can be alkyl, alkylene, alkenyl, aryl, arylene, mixed alkyl-aryl, mixed aryl-alkyl, cycloaliphatic and heterocyclic and can contain from about one to about thirty carbon atoms and can also contain ester groups, alkoxy groups, hydroxy groups, halogen atoms and other inert substituents. Preferably $R_4$ is derived from dihydric alcohols, such as glycols containing from two to about thirty carbon atoms, including ethylene glycol, propylene glycol, diethylene glycol, dipropylene glycol, tetramethylene glycol, neopentyl glycol and decamethylene glycol or from monohydric alcohols containing from one to about thirty carbon atoms, such as methyl, ethyl, propyl, n-butyl, t-butyl, isobutyl, octyl, decyl and lauryl alcohols.

The sum of $n_1$, $n_2$ and $n_3$ is four, $n_1$ is either two or three, $n_2$ can range from one to two and $n_3$ can range from zero to one. Preferably, $n_1$ is two.

The following organotin compounds are typical of those coming within the invention:

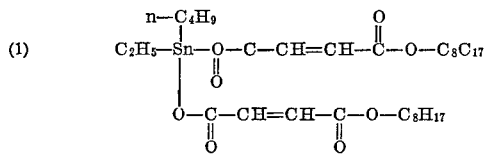

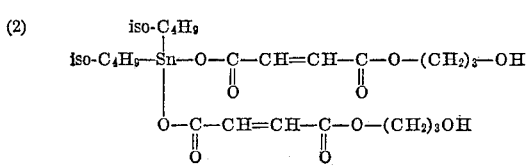

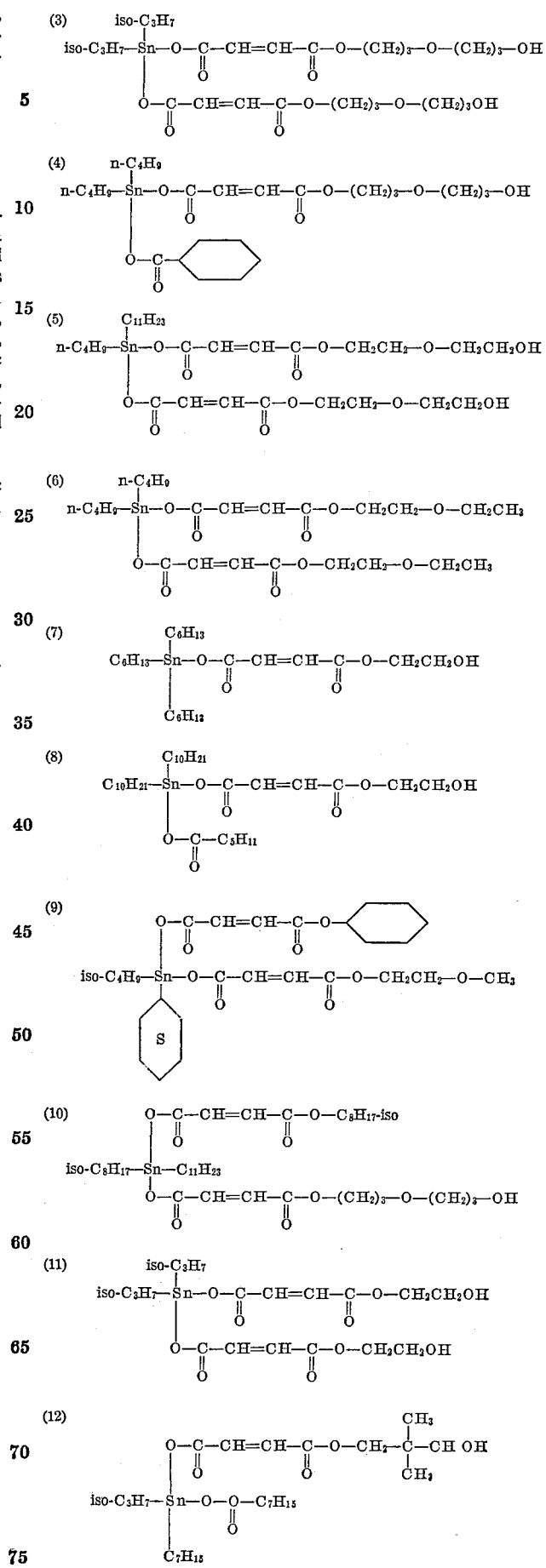

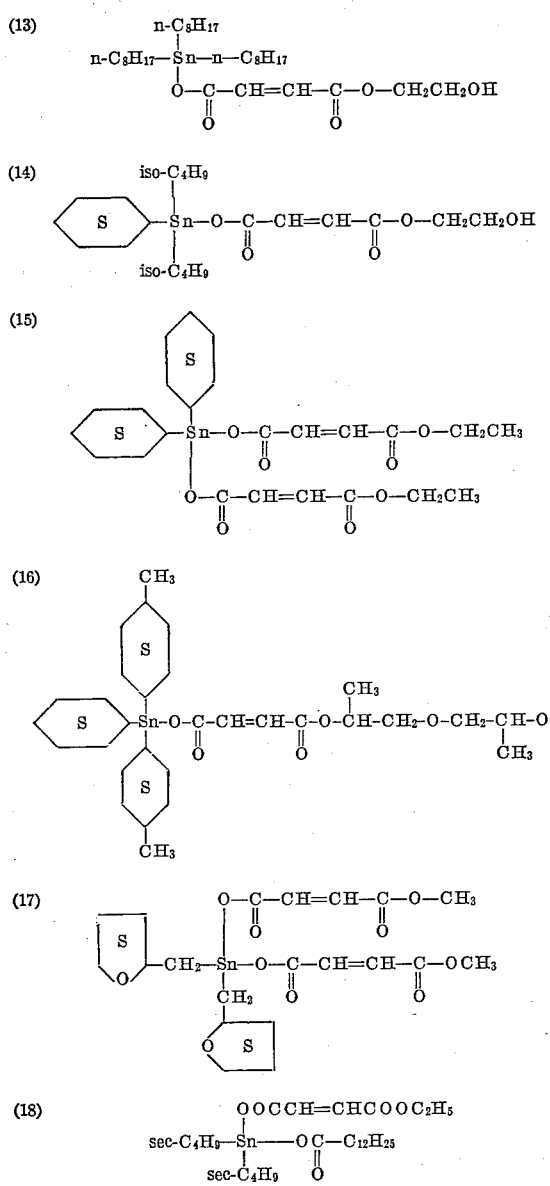

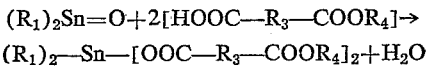

These compounds are readily prepared by conventional methods as by reacting the corresponding organotin oxides with the appropriate organic carboxylic acid. A typical reaction for such a preparation is as follows:

$$(R_1)_2Sn=O + 2[HOOC—R_3—COOR_4] \rightarrow$$
$$(R_1)_2—Sn—[OOC—R_3—COOR_4]_2 + H_2O$$

Additional details on the preparation of organotin compounds can be had by reference to the publication, "The Development of the Organotin Stabilizers" by H. Verity Smith (The Tin Research Institute, Middlesex, England (1959)).

The organic sulfides of this invention will contain the nucleus >CH—S—CH< in the molecule. This group can be attached to other structures forming saturated or unsaturated straight or branched open chain or carbocyclic or nonaromatic heterocyclic sulfides. The groups attached to the nucleus can be substituted with other groups such as aryl, carbonyl, alkoxy, aryloxy, amido, nitrile, ester, oxyether, thioether, hydroxyl and halogen groups. Such substituents are preferably at a position at least one carbon atom removed from the nucleus. Preferably, hydroxyl and halogen are at least three carbon atoms removed from the nucleus.

The preferred organic sulfides for use in this invention can be characterized by the formula:

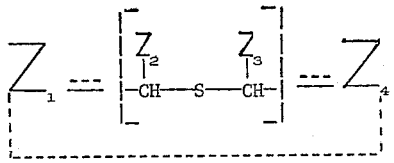

in which $Z_1$, $Z_2$, $Z_3$ and $Z_4$ can each be hydrogen or an organic group containing from one to about thirty carbon atoms. $Z_1$ and $Z_4$ can be taken together as a heterocyclic ring including the sulfur. $Z_1$, $Z_2$, $Z_3$ and $Z_4$ can for example be saturated or unsaturated hydrocarbon radicals such as alkyl, alkenyl, cycloalkyl, arylalkyl and alkylarylalkyl, or radicals including oxygenated groups and/or additional oxy- and thio-carboxylic acid, oxy- and thio-carboxylic ester, hydroxyl, amido, nitrile, oxyether, thioether, and carbonyl groups and halogen atoms such as chlorine, bromine and iodine.

These organic sulfides should have a boiling point of at least about 175° C. to ensure nonvolatility, and preferably have a maximum molecular weight of about 800 per sulfur atom to ensure compatability with the polyvinyl chloride resin compositions. The Z radicals are attached to the >CH—S—CH< nucleus at any portions of the Z radical, but not through a carbonyl group or through a carbon atom of an aromatic ring. Preferably, the Z radicals do not have a hydroxyl group or halogen atom on a carbon atom alpha or beta to a thioether sulfur atom including the sulfur atom of the >CH—S—CH< nucleus.

Representative Z groups include the following: methyl, ethyl, isopropyl, propyl, t-butyl, isobutyl, n-butyl, isooctyl, 2-ethylhexyl, decyl, undecyl, dodecyl, oleyl, tetradecyl, vinyl, ethylene (as a bridge of $Z_2$ and $Z_3$), pentamethylene (as a bridge of $Z_1$ and $Z_2$), propenyl, β-phenethyl, 8-heptadecenyl, linoleyl, ethoxymethyl, butoxyethyl, ethoxyethyl, ethylthiomethyl, 3-phenylpropyl, 4-naphthylpentyl, carboxymethyl, carbomethoxyl, 11-chloroundecyl, 4-bromobutyl, p-iodo-β-phenethyl,

cyclopentyl, cyclohexyl, β-naphthaleneethyl, 3-hydroxy propyl, 3-carboxamidopropyl, cyanoethyl, cyanodecyl, 3-ketobutyl.

Representative organic sulfides applicable for use in this invention include the following:

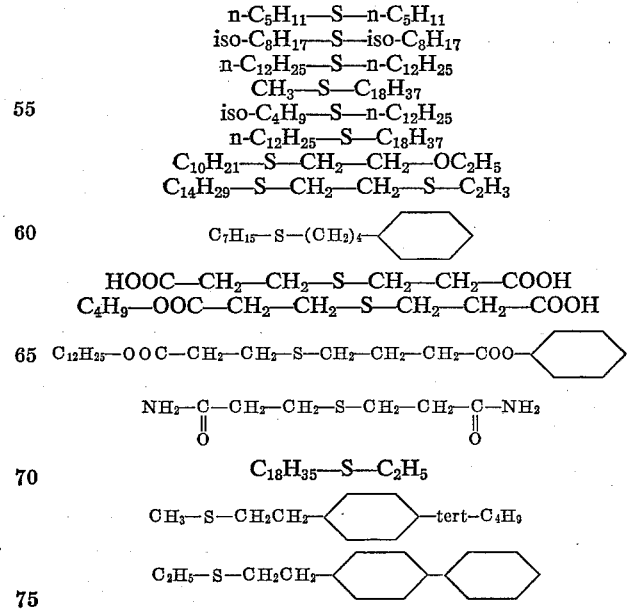

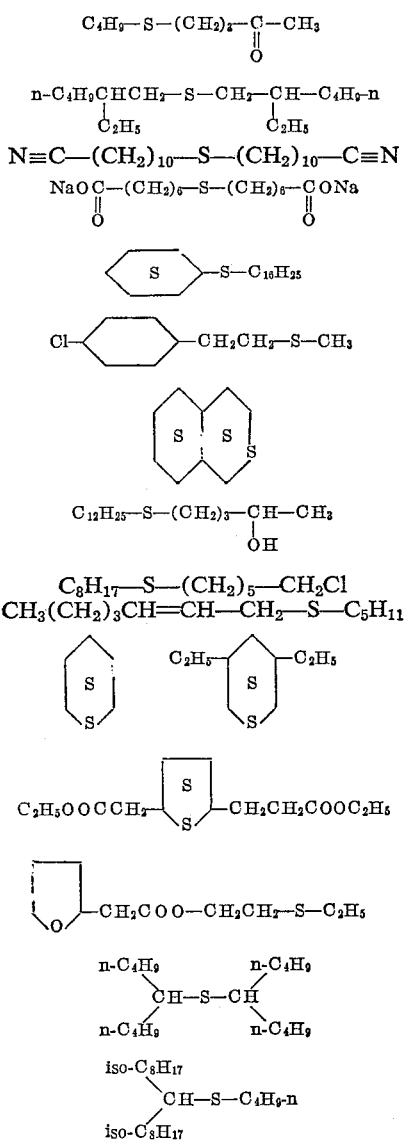

A particularly preferred class of organic sulfides are the esters of thiodipropionic acid. The thiodipropionic acid ester has the following formula:

$$Q_1OOCCH_2CH_2\!-\!S\!-\!CH_2CH_2COOY$$

in which Q is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyoxyalkylene radicals; and esters thereof with aliphatic carboxylic acids; and Y is selected from the group consisting of (a) hydrogen, (b) a second Q radical $Q_2$, which can be the same as or different from the $Q_1$ radical, (c) a polymeric chain of $n$ thiodipropionic acid ester units:

$$Q_1O[OCCH_2CH_2SCH_2CH_2COOXO]_nOCCH_2CH_2\!-\!S\!-\!CH_2CH_2COOT$$

where T is hydrogen, $Q_2$ or M, $n$ is the number of thiodipropionic acid ester units in the chain, and X is a bivalent hydrocarbon group of the type of $Q_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the Q and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $Q_1OOCCH_2CH_2SCH_2CH_2COOH$
(b) $Q_1OOCCH_2CH_2SCH_2CH_2COOQ_2$
(c) $Q_1O[OCCH_2CH_2SCH_2CH_2COOX\!-\!O]_n$
    $OCCH_2CH_2SCH_2CH_2COOT$
(d) $Q_1OOCCH_2CH_2SCH_2CH_2COOM$

In the above formulae $Q_1$ and $Q_2$, M, X and T are the same as before. In the polymer (c), as in the other forms of thiodipropionic acid esters, the total number of carbon atoms per sulfur atom is within the range from about ten to about sixty.

The aryl, alkyl, alkenyl and cycloalkyl groups can, if desired, contain inert, nonreactive substituents such as halogen and other carbocyclic and heterocyclic ring structures condensed therewith.

Typical Q radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

and

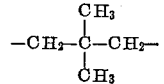

arylene radicals such as phenylene

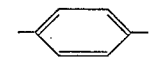

methylenephenylene

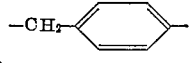

dimethylene phenylene

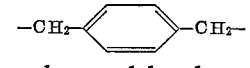

and alicyclylene such as cyclohexylene

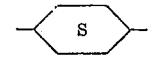

and cyclopentylene

As exemplary of the thiodipropionic acid esters which can be used, there can be mentioned the following: monolauryl thiodipropionic acid, dilauryl thiodipripionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionate, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecyl-benzyl thiodipropionate, and mono(dodecylbenzyl)thiodipropionic acid.

These esters are for the most part known compounds, but where they are not available, they are readily prepared by esterification of thiodipropionic acid and the corresponding alcohol.

The stabilizing combination of this invention contains from about 0.001 to about 10 parts of organic sulfide by weight per part of organotin compound. Preferably, there should be between about 0.002 to about 1 part by weight of organic sulfide per part of organotin compound. The proportion of organic sulfide to organotin compound employed in any given stabilizing combination of the invention within the range set forth is determined by the characteristics of the particular compounds and resins employed. The two components of the stabilizing combination can be blended together by conventional methods and thereafter added to the resin.

These stabilizing combinations, as has been indicated, are particularly effective stabilizers for rigid polyvinyl chloride resin compositions, that is, resin compositions which are formulated to withstand high processing temperatures of the order of 375° F. and higher. A small degree of plasticization of such polymers is permissible provided this does not reduce the softening point of the resin to below the temperature to which it must be subjected. Such partially plasticized but still rigid resin compositions do not contain more than about 10% by weight of plasticizer. Most rigid compositions generally contain no plasticizer at all.

The "polyvinyl chloride" as used herein is inclusive not only of vinyl chloride homopolymers of all types, but also of copolymers of vinyl chloride in a major proportion, and other copolymerizable monomers in minor proportion, such as copolymers of vinyl chloride and vinyl acetate, copolymers of vinyl chloride and vinylidene chloride, copolymers of vinyl chloride with maleic or fumaric acid esters and copolymers of vinyl chloride with styrene, and also mixtures of vinyl chloride homopolymer resins in a major proportion with a minor proportion of other synthetic resins, such as polyethylene, chlorinated polyethylene, or copolymers of acrylonitrile, butadiene and styrene. Among the polyvinyl chlorides which can be stabilized are the uniaxially-stretch-oriented polyvinyl chloride described in U.S. Patent No. 2,984,593 to Isaksem et al., that is, syndiotactic polyvinyl chloride, as well as atactic and isotactic polyvinyl chlorides.

The stabilizing combinations of this invention can, if desired, be employed in conjunction with other stabilizers for polyvinyl chloride resins, although, in most cases, the stabilization imparted by the combinations of this invention will be sufficient. In some cases, however, for particular end used, special stabilization effects may be desired.

Polyvinyl chloride stabilized by means of this invention will typically contain from about 0.01 to about 2 parts of organic sulfide and from about 0.2 to about 10 parts of organotin compound, by weight per 100 parts of polyvinyl chloride resin. Preferably, there should be from about 0.01 to about 0.5 part of organic sulfide and from about 0.5 to about 5 parts of organotin compound by weight per 100 parts of resin. The proportion of organic sulfide to organotin compound employed in the stabilizing combination of the invention is determined by the characteristics of the particular compounds and resins employed. The higher the ultimate temperature to which the stabilized composition is to be subjected, the larger the amount of stabilizing combination. More stabilizer combination can be used, but usually no better result is obtained, and therefore such amounts are uneconomical and wasteful.

A small amount, usually not more than 1.5% by weight of the resin, of a parting agent or lubricant also can be included. Typical parting agents are the higher aliphatic acids and salts having from twelve to twenty-four carbon atoms, such as stearic acid, lauric acid, palmitic acid and myristic acid, lithium stearate and calcium palmitate, ester of polyols and oxidized waxes, such as glycol esters of oxidized montan wax, mineral lubricating oils, polyvinyl stearate, polyethylene and paraffin wax. For some purposes, it may be desirable to combine the lubricant with the stabilizing composition to form a combined stabilizing and lubricating composition which can, in particular instances, be easier to combine with the resin then the stabilizing combinations above.

The preparation of the stabilized composition is easily accomplished by conventional procedures. The selected stabilizer combination ordinarily is blended with the polyvinyl chloride resin, using, for instance, plastic mixing rollers, at a temperature at which the mix is fluid and thorough blending facilitated, milling the stabilizer with the resin on a two-roll mill at from 300 to 400° F. for a time sufficient to form a homogenous sheet, five minutes, usually. After the mass is uniform, it is sheeted off in the usual way.

The following examples in the opinion of the inventor represent preferred embodiments of polyvinyl chloride resin compositions of his invention and exhibit the synergistic effect obtained thereby.

EXAMPLE I

A series of formulations was prepared having the following composition.

Plastic composition: Parts by weight
    Geon 103 Ep (homopolymer of polyvinyl chloride) _____ 150
    Calcium stearate _____ 0.75
    Stabilizer _____ As noted The stabilizer was added in proportion noted in Table I below and was blended with the polyvinyl chloride and the mixture was fused on a two-roll mill and then tested in an oven at 375° F. for heat stability. The discoloration and clarity were noted, and the color is reported in Table I below.

The results indicate that neither dibutyl tin-bis-(dipropylene glycol maleate) nor dilaurylthiodipropionate are particularly effective stabilizers for rigid polyvinyl chloride resins. However, when the two compounds are combined, as in Composition C, the stabilization afforded to rigid polyvinyl chloride resins is at least equal to that obtained through the use of a conventional organotin sulfur-containing stabilizer, dibutyl tin dioctyl thioglycolate (Composition D) with the further advantage that Composition C did not have the odor characteristic of organotin sulfur-containing compounds which was present in Composition D. After one hour of heating at 375° F., Sample C had not significantly darkened thus indicating its suitability under the standards conventionally employed for rigid polyvinyl chloride resin stabilizers.

*Table I*

[375° F.]

| | Composition Number | | | |
|---|---|---|---|---|
| | A | B | C | D |
| | Stabilizing Composition | | | |
| | 3.0 parts dibutyl tin-bis-(isooctylmaleate) | 0.1 part dilaurylthiodipropionate | 3.0 parts dibutyl tin-bis-(isooctyl maleate) plus 0.1 part dilaurylthiodipropionate | 3.5 parts dibutyl tin dioctylthioglycolate |
| | Color | Color | Color | Color |
| Time of Heating: | | | | |
| Initial | Colorless | Colorless | Colorless | Colorless. |
| After 15 min | Pale Yellow | Red | Pale Yellow | Pale Yellow. |
| After 30 min | Yellow | Dark Brown | ----do---- | Do. |
| After 45 min | Brownish Yellow | Charred | Yellow | Yellow. |
| After 60 min | Olive | ----do---- | ----do---- | Do. |
| After 75 min | Brown | ----do---- | Green-Yellow | Orange-Yellow. |
| After 90 min | Deep Brown | | Brown | Orange-Brown. |
| After 105 min | | | ----do---- | Brown. |
| After 120 min | | | ----do---- | Deep Brown. |

EXAMPLE II

The procedure of Example I was followed using different stabilizer combinations as noted in Table II. The color was noted and is indicated in Table II.

Plastic composition: Parts by weight
Geon 103 Ep _____ 150
Mineral oil _____ 0.75
Dilaurylthiodipropionate _____ 0.1
Organotin compound _____ As noted As in the case of Example I, this example indicates the superior stabilizing effects obtained by means of this invention. All of the compositions employed showed good stability after being heated for 1 hour at 375° F.

EXAMPLE III

The procedure of Example I was followed, using different stabilizer combinations as noted in Table III. In each case the stabilizer combination was first mixed together and then blended into the resin. The color was noted and is indicated in Table III.

Plastic compositions: Parts by weight
Geon 103 Ep _____ 150
Di-n-octyl tin-diisooctyl maleate _____ 3.2
Organic sulfide, as noted in Table III.

This example indicates that the synergistic effects obtained by means of the present invention are obtainable with a wide variety of organic sulfides and that good stabilization is observable after heating for one hour at 375° F.

*Table II*

[375° F.]

| | Composition Number | | |
|---|---|---|---|
| | E | F | G |
| | Organotin Compound | | |
| | 5 parts di-n-octyl tin-bis-(dipropylene glycol monomaleate) | 4.15 parts tri-n-octyl tin mono-iso-octyl maleate | 4.5 parts dibutyltin-bis-(monoiso-octyl fumarate) |
| | Color | Color | Color |
| Time of Heating: | | | |
| Initial | Colorless | Colorless | Colorless. |
| After 15 min | Pale Yellow | Pale Yellow | Very Pale Yellow. |
| After 30 min | Yellow | ----do---- | Pale Yellow. |
| After 45 min | Light Yellow | Light Yellow | Yellow. |
| After 60 min | Yellow | Yellow | Do. |
| After 75 min | Deep Yellow | Deep Yellow | Deep Yellow |
| After 90 min | Olive | Light Olive | Olive. |
| After 105 min | Brown | Brown | Brown Yellow. |
| After 120 min | Dark Brown | ----do---- | |

Table III
[375° F.]

| | Composition Number | | | |
|---|---|---|---|---|
| | L | M | N | P |
| | Organic Sulfide 0.1 part | | | |
| | n-Dodecyl-n octadecyl sulfide | Cetyl 3-n-octylthiopropionate | 4-Phenylbutyl heptyl sulfide | Tetradecyl 2-ethylthioethyl sulfide |
| | Color | Color | Color | Color |
| Time of Heating: | | | | |
| Initial | Colorless | Colorless | Colorless | Colorless. |
| After 15 min | Very Pale Yellow | Light Yellow | Pale Yellow | Pale Yellow. |
| After 30 min | ----do---- | Pale Yellow | ----do---- | Do. |
| After 45 min | Yellow | Yellow | Light Yellow | Light Yellow. |
| After 60 min | Deep Yellow | ----do---- | Yellow | Yellow. |
| After 75 min | Dark Olive | Dark Brown | Deep Yellow | Deep Yellow. |
| After 90 min | Dark Brown | ----do---- | Olive | Olive. |
| After 105 min | ----do---- | ----do---- | Brown | Do. |
| After 120 min | ----do---- | ----do---- | ----do---- | Brown. |

EXAMPLE IV

The procedure of Example III was repeated, using as the resin 127.5 parts of "Vinylite VYHH," a copolymer of 87% vinyl chloride and 13% vinyl acetate, and 22.5 parts of "Vinylite VYNS," a copolymer of 90% vinyl chloride and 10% vinyl acetate. The stabilizer combination employed was 4.0 parts of dibutyl tin bis-(monoisooctyl maleate) and 0.1 part dilaurylthiodipropionate. The resulting composition remained colorless for a long period of time and had not substantially darkened after one hour of heating at 375° F. indicating that the stabilizer combinations of this invention are also applicable to copolymers of vinyl chloride.

EXAMPLE V

The excellent stability to light obtained by means of this invention is illustrated by the following formulations which were prepared in accordance with the procedure of Example I.

| Plastic compositions: | Parts by weight |
|---|---|
| Geon 103 Ep | 150 |
| Dibutyl tin bis-(isooctyl maleate) | 3.0 |
| Calcium stearate | 0.75 |
| Organic sulfide, as noted below | 0.1 |

The compositions were each exposed to ultraviolet light in a weatherometer type XW at a black panel temperature of 125° F. Samples of each composition were removed from the apparatus at periodic intervals and any discoloration was noted. The results are indicated below.

| Organic Sulfide | Results |
|---|---|
| Dilauryl thiodipropionate | Sample remained colorless after 200 hours in the weatherometer. |
| Cetyl 3-n-octylthiopropionate | Sample remained colorless after 100 hours. After 200 hours, it showed a very slight trace of yellow. |

Example VI

A combined stabilizing and lubricating combination was prepared by mixing together 3.5 parts of n-trihexyl tin ethyleneglycol monomaleate with 0.3 part of didecyl thiodibutyrate and 0.9 part of mineral oil. This combined stabilizing and lubricating composition was then blended with 150 parts by weight of polyvinyl chloride resin on a two-roll mill and tested in an oven at 375° F. The composition had not substantially darkened after one hour at 375° F.

Example VII

The procedure of Example III was followed using as the stabilizing combination 3.8 parts of triethylhexyl tin propylene glycol monofumarate and 0.1 part of 4-hydroxybutyl n-dodecyl sulfide. Good stabilization was noted after the composition was heated for one hour at 375° F.

Example VIII

The procedure of Example III was followed using 0.1 part of 4-chlorobutyl n-dodecyl sulfide and 4.2 parts of dibutyl tin bis-(propylene glycol dimaleate) as the stabilizing combination. Good stabilization was noted after one hour at 375° F.

Example IX

The procedure of Example III was followed using as the stabilizing combination 4.2 parts of dioctyl tin maleate laurate and 0.1 part of 4-chlorobutyl n-dodecyl sulfide. Good stabilization was noted after one hour at 375° F.

The embodiments of the invention in which an exclusive property or privilege is claimed are defined as follows.

I claim:

1. A rigid polyvinyl chloride resin composition having increased resistance to deterioration when heated at 375° F. comprising (a) a rigid polyvinyl chloride resin, (b) an organotin compound having organic radicals linked to tin only through carbon and oxygen, at least two organic radicals being linked through carbon, and at least one organic radical being linked through oxygen to a carboxyl group of an unsaturated dicarboxylic acid ester of an alcohol having from one to two hydroxyl groups, said organotin compound being present in a stabilizing amount, and (c) an organic sulfide characterized by the formula

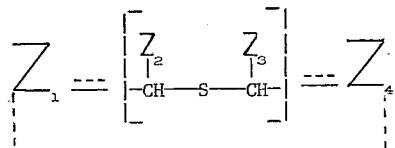

in which the Z groups are selected from the group consisting of hydrogen and organic groups containing from one to about thirty carbon atoms, selected from the group consisting of alkyl, alkenyl, cycloalkyl, arylkyl, alkylarylalkyl, oxygenated such groups, and such groups containing oxy- and thio-carboxylic acid, acid salt, oxy- and thio-carboxylic acid ester, hydroxyl, amido, nitrile, oxyand thio-ether, carbonyl and halogen groups, the Z groups being linked to the nucleus of the molecule through atoms other than aromatic and carbonyl carbon atoms, said organic sulfide being present in an amount to enhance the stabilizing effect of the organotin compound.

2. A composition as in claim 1 wherein the organic sulfide is characterized by the formula

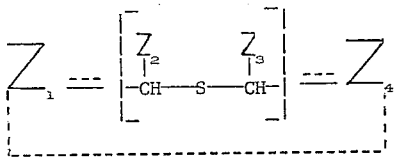

in which the Z groups are selected from the group consisting of hydrogen and organic groups containing from one to thirty carbon atoms, the Z groups being linked to the remainder of the molecule through other than aromatic and carbonyl carbon atoms.

3. A composition as in claim 1 wherein the dicarboxylic acid is maleic acid.

4. A composition as in claim 1 wherein the dicarboxylic acid is fumaric acid.

5. A composition as in claim 1 wherein the polyvinyl chloride resin is a homopolymer of vinyl chloride.

6. A composition as in claim 1 wherein the polyvinyl chloride resin is a coploymer of vinyl chloride and vinyl acetate.

7. A composition as in claim 1 wherein the polyvinyl chloride resin is comprised of a major proportion of vinyl chloride homopolymer and a minor proportion of chlorinated polyethylene.

8. A composition as in claim 1 wherein the organic sulfide is an alkyl sulfide.

9. A composition as in claim 1 wherein the organic sulfide is an arylalkyl sulfilde.

10. A composition as in claim 1 wherein the organic sulfide contains the group

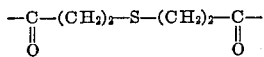

in the molecule.

11. A stabilizing composition capable of enhancing the resistance of rigid polyvinyl chloride resin compositions to deterioration upon heating at 375° F. comprising (a) an organotin compound having organic radicals linked to tin only through carbon and oxygen, at least two organic radicals being linked through carbon to tin, and at least one organic radical being linked through oxygen to tin to a carboxyl group of an unsaturated dicarboxylic acid ester of an alcohol having from one to two hydroxyl groups, and (b) an organic sulfide characterized by the formula

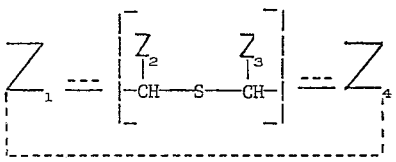

in which the Z groups are selected from the group consisting of hydrogen and organic groups containing from one to about thirty carbon atoms, selected from the group consisting of alkyl, alkenyl, cycloalkyl, arylalkyl, alkylarylalkyl, oxygenated such groups, and such groups containing oxy- and thio-carboxylic acid, acid salt, oxy- and thio-carboxylic acid ester, hydroxyl, amido, nitrile, oxy- and thio-ether, carbonyl and halogen groups, the Z groups being linked to the nucleus of the molecule through atoms other than aromatic and carbonyl carbon atoms, said organic sulfide being present in an amount to enhance the stabilizing effect of the oranotin compound.

12. A stabilizing composition as in claim 11 wherein the dicarboxylic acid is maleic acid.

13. A stabilizing composition as in claim 11 wherein the dicarboxylic acid is fumaric acid.

14. A stabilizing composition as in claim 11 wherein the organic sulfide is an alkyl sulfide.

15. A stabilizing composition as in claim 11 wherein the organic sulfide is an arylalkyl sulfide.

16. A stabilizing composition as in claim 11 wherein the organic sulfide contains the group

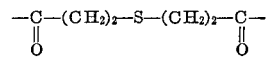

in the molecule.

17. A stabilizing composition as in claim 11 also containing a lubricant.

References Cited by the Examiner

UNITED STATES PATENTS

| | | | |
|---|---|---|---|
| 3,019,247 | 1/1962 | Mack et al. | 260—45.75 X |
| 3,027,350 | 3/1962 | Mack et al. | 260—45.75 X |
| 3,063,963 | 11/1962 | Wooten et al. | 260—45.75 X |
| 3,067,166 | 12/1962 | Zaremsky | 260—45.75 X |
| 3,078,290 | 2/1963 | Heckenbleikner et al. | 260—45.75 |

LEON J. BERCOVITZ, *Primary Examiner.*

H. E. TAYLOR, *Assistant Examiner.*